April 10, 1945.  B. CLASON  2,373,292

LIQUID LEVEL GAUGE

Filed Jan. 29, 1943

Inventor
Bertil Clason
By Blackmore, Spencer & Hunt
Attorneys

Patented Apr. 10, 1945

2,373,292

UNITED STATES PATENT OFFICE 2,373,292

LIQUID LEVEL GAUGE

Bertil Clason, Flint, Mich., assignor to General Motors Corporation, Detroit, Mich., a corporation of Delaware Application January 29, 1943, Serial No. 473,940

6 Claims. (Cl. 201—48)

This invention relates to liquid level indicating systems and has particular reference to an electric telemetric system for indicating the amount of gasoline in the reservoir of an automotive vehicle.

Liquid level indicators of the type shown in Bacon 2,266,298 are used with tanks or reservoirs which are relatively shallow and such indicators have proved to be very satisfactory, but when a deep narrow container or reservoir is used, such as is the case in some armored vehicles, such as Army tanks, an apparatus of the type shown in Bacon is no longer practical. The present invention discloses a reservoir unit adaptable to deep narrow containers.

The tank unit comprising the invention is applied at the bottom of the tank or container and consists of a housing with a bellows therein. The bellows is subject to the head of liquid in the tank and an electric resistance attached to the bellows is adapted to move with the bellows over a stationary contact. The resistance is in an electric circuit and the amount of resistance in the circuit will determine the reading on the scale of a differential galvanometer mounted at a suitable place convenient to the driver of the vehicle. A galvanometer of the type shown in Bacon 1,791,786, Schwarze 2,139,385 or 2,139,386 can be advantageously used.

Figure 1:
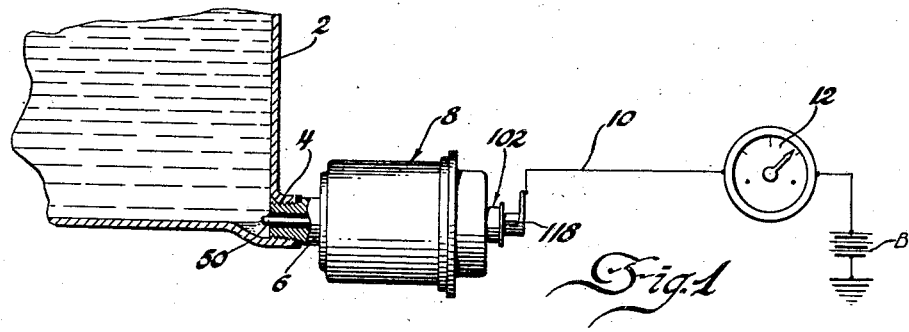
Figure 1 shows the application of the unit to a tank.

Referring to the drawing, a container or reservoir for holding fuel is indicated at 2. This container has a threaded opening 4 at its bottom and in this opening there is screwed the socket or plug 6 of the tank unit 8. The tank unit 8 has the lead wire 10 which leads to the galvanometer 12.

Figure 2:
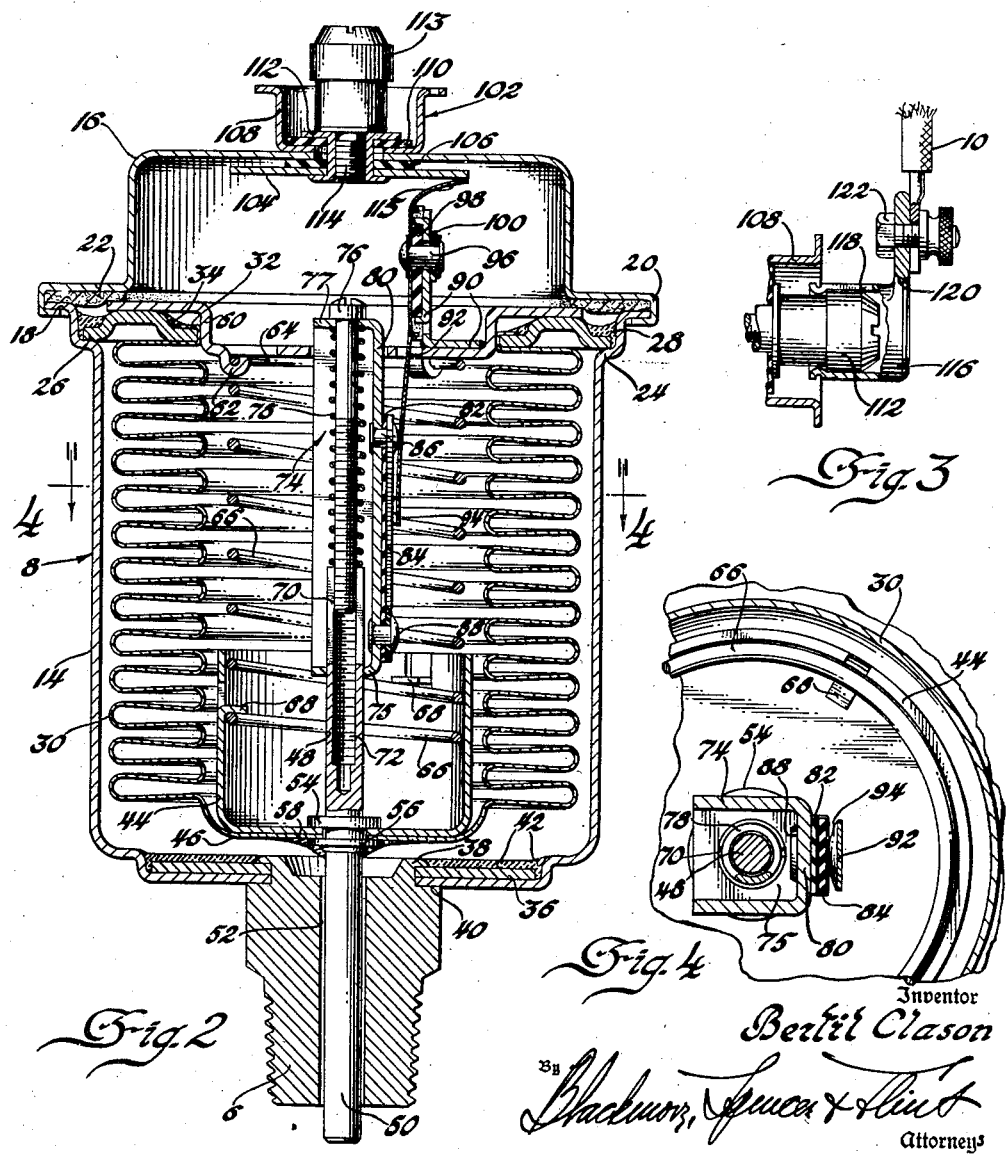
Figure 2 is an enlarged sectional detailed view through the unit of the invention.

The tank or reservoir unit 8 is shown in detail in Figure 2. It comprises a housing 14 which includes a cap 16, secured to a flange 18 on the housing by turning over the edge of the flange 20 of the cap. A fabric washer 22 is positioned between the flange 18 and flange 20 to form a fluidtight connection, but if desired the washer 22 can be omitted and the flange 20 can then rest directly on the flange 18 and on the spring retainer 60.

The housing 14 has a shoulder 24 adjacent the cap 16 and on this shoulder there is positioned the mounting ring 26. This ring is soldered to the shoulder by the solder 28 and at its inner edge it has secured thereto the open end of a bellows 30. The bellows has the outwardly directed end flange 32 which is soldered as shown at 34 in fluidtight relation to the ring 26.

The socket or plug 6 is secured in an opening in the end of the housing 14. The housing end has a recessed part in which there is received the washer 36 and an end ring edge 38 of the stud is turned over on the washer. This edge 38 and the shoulder 40 make a very rigid connection. Solder 42 between the washer, the edge 38, and the cup makes a fluidtight seal and permanently holds the washer 36 in the recess.

A cup or calibrating sleeve 44 is seated on the bottom 46 of the bellows and the cup and the bellows have mating openings through which there passes a support or push rod 48, the lower end 50 (Figure 2) of which extends into a bore 52 of the plug 6. A ring 54, integral with the rod 48, rests on the bottom of the cup 44, and a washer 56 on the underside of the bellows bottom 46 is received on a shoulder on the rod and fits flatwise against the bottom. Solder 58 is used rigidly to hold the parts together and to make a fluidtight connection.

A spring retainer 60 is mounted on the mounting ring 26 and has its edge received between the fabric washer 22 and the mounting ring 26. When the washer 22 is not used, the spring retainer 60 is received between the mounting ring 26 and the flange of the cap 16. The retainer 60 has a central depressed part which extends into the open end of the bellows, and three tongues 62 grip around and tightly hold the end coil 64 of a coil spring 66.

The spring 66 extends into the cup and the end coils thereof are threaded among the inwardly bent tabs 68 (three in number, spaced both circumferentially and longitudinally of the cup) formed in the cup. The end connection between the end coils of the spring 66 and the tabs 68 forms an adjustable connection to enable a compensation for stiffness of bellows. The spring 66 is under tension and always urges the bellows to the compressed position, and in order to make all tank units calibrate properly it may be necessary to change the rate of the spring by increasing or decreasing the number of coils. This is accomplished by turning the spring retainer 60 in the proper direction.

The support or push rod 48 has one end inside the bellows 30. This end is split as at 70 and internally threaded as at 72. A bracket 74 has an opening in one end wall 75 and fits over the split end 70. A bolt 76 passes through an opening in the other end wall 77 of the bracket and is screwed into the internally threaded end 72 of the rod 46. A compression coil spring 78 surrounds the bolt 76 and is positioned between the end of the rod 46 and the wall 77 of the bracket 74 and constantly urges the bracket against the head of the bolt 76.

On the back 80 of the bracket 74 a strip of insulation 82 is positioned and over the insulation there is a resistance 84 wound around a strip of insulation. The insulation 82 and the resistance 84 are secured at one end to the back by means of a metal rivet 86 which makes an electric contact between the resistance and the bracket. The other end of the insulation 82 and the insulation of the resistance 84 are secured to the back 80 by means of a rivet 88. The rivet 88 is not in contact with the resistance 84.

The spring retainer 60 has an angle bracket 90 rigidly mounted thereon. This bracket has secured thereto a spring contact finger 92 having a contact 94 at its end. The contact is always pressed against the resistance. A rivet 96 secures the spring finger intermediate its ends to the bracket 90. A piece of insulation 98 spaces the finger 92 from the bracket and this piece of insulation is held between two short fingers formed from the bracket 90. Another piece of insulation 100 is applied between the rivet end and the bracket 90.

The center of the cap 16 has an opening for the application of an electric contact indicated as a whole at 102. The contact 102 comprises the inner washer 104, the insulation washer 106, the cup 108 outside the cap, a second insulation washer 110, a hollow internally threaded rivet 112 which passes through mating openings in parts 104, 106, 108 and 110 and rigidly holds these parts together, and a contact head or terminal 113 which has a threaded end 114 which screws into the internally threaded rivet 112. The openings in the cap 16 and the cup 108 to allow the rivet to pass therethrough are oversize to prevent contact with the rivet.

The end 115 of the contact finger 92 is bent as shown and is always in contact with the washer 104.

Figure 3:
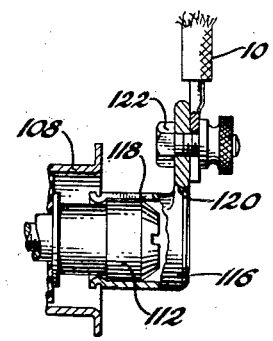
Figure 3 is a sectional detailed view of the electrical connection at the end of the unit.
Figure 4:
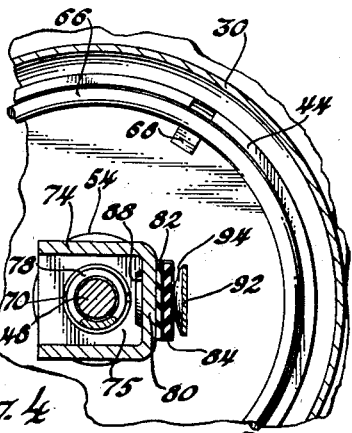
Figure 4 is a section on the line 4—4 of Figure 2.

The terminal head 113 is connected to the wire 10 as shown in Figure 3. A cap 116 is slotted as at 118 and is adapted removably to snap over the terminal head 113. The cap 116 has an integral arm 120 to which the wire 10 is connected by means of a bolt and nut 122.

The unit 6 is applied to the bottom of the tank where it will be subject to the pressure of the head of liquid in the tank or container 2. When the container is full, the pressure exerted by the liquid through the bore 52 on the bellows 30 will be a maximum and cause the bellows to be collapsed to its greatest extent. This collapse of the bellows will move the rod 46 and the bracket 74 to cause the resistance 84 to move relative to the contact 94 and place the maximum amount of resistance in the circuit. This will give one extreme reading on the scale of the dial of the instrument 12. On the other hand, when the tank 2 is empty there will be no head of liquid and therefore no liquid pressure on the bellows 30. The bellows 30, opposed by the spring 66, will expand to its maximum and cause the resistance 84 to move in the opposite direction over the contact 94 to cause the pointer on the instrument 12 to move to its other extreme position. Intermediate levels of the liquid in the tank will produce a movement of the bellows between its two extreme positions and give an intermediate reading on the instrument 12 because the contact 94 will be in an intermediate position on the resistance.

All bellows are not alike but vary in spring rate and effective area and to compensate for this difference so that the unit can be properly calibrated the spring 66 can be adjusted by turning it in the ears 68 to increase or decrease the combined spring rate of the bellows and the spring, adding or subtracting the number of free coils of the spring, as the case may be.

In the installation of the unit, the electric current will flow from the battery E through the instrument 12, the wire 10, terminal 112, washer 104, spring finger 92, resistance 84, to the bracket 74 and then through the metallic parts of the instrument to ground and back to the battery. The ignition switch of the vehicle is usually interposed in the circuit so that the current is broken when the vehicle is not in use.

In order to calibrate the tank unit 6 with reference to the instrument 12, an adjustment of the resistance 84 relative to the contact 94 is possible. The bolt 76 may be turned in either direction to move the bracket and the resistance. The instruments 12 are all uniform and the unit is calibrated with reference to the instrument before the cap 16 is applied.

I claim:

1. In a pressure operated tank unit for an electric telemetric liquid level indicating system having an electric circuit with a gauge therein, a housing secured to the bottom of the tank and accessible to the liquid in the tank, an expansible and contractible bellows mounted in the housing and adapted to be moved by the pressure of the liquid, a support attached to the end of said bellows and movable therewith, an electrical resistance attached to the support, a stationary electrical contact mounted in the unit and in contact with the resistance, the movement of said bellows enabling the resistance to move relative to the contact to put more or less resistance in the circuit, the amount of the resistance in the circuit determining the reading on the gauge, means to adjust the position of the resistance with reference to the contact to enable the calibration of the unit with reference to the gauge, a cup secured in the bellows, a tension spring between the cup and the housing constantly urging the bellows to collapsed position, and means to adjust the spring with reference to the cup to increase or decrease the pressure of the spring on the bellows to compensate for differences in stiffness of the bellows.

2. In a pressure operated tank unit for an electric telemetric liquid level indicating system having an electric circuit with a gauge therein, a housing secured to the bottom of the tank and accessible to the liquid in the tank, a pressure responsive member mounted in the housing and adapted to be moved by the pressure head of the liquid in the tank, a supporting rod secured to the pressure responsive member and movable therewith, a bracket supported on the rod, an electric resistance secured to the bracket, a stationary electric contact mounted in the housing and constantly contacting with the resistance, a bolt passing through the bracket and screw threaded into the rod to hold the bracket on the rod, a spring surrounding the bolt between the rod and the bracket and constantly pressing the bracket end against the head of the bolt, said bolt being capable of being turned to enable an adjustment of the bracket and the resistance with reference to the contact to enable the calibration of the instrument relative to the gauge, the movement of said support rod by the pressure responsive member causing the resistance to move relative to the contact and place more or less resistance in the circuit, the amount of the resistance in the circuit determining the reading of the gauge.

3. In a pressure operated tank unit for an electric telemetric liquid level indicating system, a housing, a bellows rigidly mounted at one of its ends in fluidtight relation in the housing and being free at its other end, a tension spring secured at both ends in the housing between the inside of the bellows and the housing and constantly urging the bellows to collapsed position, said spring being adjustably mounted at one end, said spring being capable of being turned to cause an adjustment thereof at the adjustably mounted end to increase or decrease the amount of tension to compensate for differences in stiffness of bellows.

4. In a pressure operated tank unit for an electric telemetric liquid level indicating system, a housing, a bellows rigidly mounted at one of its ends in fluid tight relation in the housing and being free at its other end, a cup mounted at the bottom of the bellows, a tension spring secured at both ends in the housing between the housing and the cup and constantly urging the bellows to collapsed position, a plurality of ears on the cup adapted to engage one end of the spring to retain it in the cup, said spring being capable of being turned in the cup on the ears to cause an adjustment thereof to increase or decrease the amount of tension to compensate for differences in stiffness of bellows.

5. In a pressure operated tank unit for an electric telemetric liquid level indicating system having an electric circuit with a gauge therein, a housing secured to the bottom of the tank and accessible to the liquid in the tank, a bellows mounted in the housing and adapted to be moved by the pressure head of the liquid, a support attached to said bellows and movable therewith, an electrical resistance attached to the support, a stationary electrical contact mounted in the unit and in contact with the resistance, the movement of said bellows enabling the resistance to move relative to the contact to put more or less resistance in the circuit, the amount of the resistance in the circuit determining the reading on the gauge, means to adjust the position of the resistance with reference to the contact to enable the calibration of the unit relative to the gauge, a tension spring mounted in the housing between the housing and said bellows and constantly urging said bellows to its full tank position, and means to adjust the spring by turning it clockwise or counter-clockwise as the case may be, adding or subtracting coils to change the rate of the spring and the combined spring rate of the bellows and the spring to enable adjustment for variation in stiffness and effective area of the bellows.

6. In a pressure operated tank unit for an electric telemetric liquid level indicating system having an electric circuit with a gauge therein, a housing secured to the bottom of the tank and accessible to the liquid in the tank, an expansible and contractible bellows mounted in the housing and adapted to be moved by the pressure of the liquid, a support attached to the end of said bellows and movable therewith, an electrical resistance attached to the support, a stationary electrical contact mounted in the unit and in contact with the resistance, the movement of said bellows enabling the resistance to move relative to the contact to put more or less resistance in the circuit, the amount of the resistance in the circuit determining the reading on the gauge, means to adjust the position of the resistance with reference to the contact to enable the calibration of the unit with reference to the gauge, a cup secured in the bellows, a plurality of ears on the cup, a tension spring between the cup and the housing constantly urging the bellows to collapsed position, said ears adjustably retaining one end of the spring, the rotation of the spring on the ears causing an adjustment of the spring to increase or decrease the amount of tension exerted by the spring to expand the bellows.

BERTIL CLASON.